United States Patent
Kim et al.

(10) Patent No.: US 8,464,253 B2
(45) Date of Patent: Jun. 11, 2013

(54) APPARATUS AND METHOD FOR PROVIDING SERVICES USING A VIRTUAL OPERATING SYSTEM

(75) Inventors: Byung-woan Kim, Seoul (KR); Sang-bum Suh, Seoul (KR); Kyung-ah Chang, Seoul (KR); Seong-yeol Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 12/629,244

(22) Filed: Dec. 2, 2009

(65) Prior Publication Data

US 2010/0138832 A1    Jun. 3, 2010

(30) Foreign Application Priority Data

Dec. 3, 2008 (KR) .................. 10-2008-0121863

(51) Int. Cl.
*G06F 9/455* (2006.01)
(52) U.S. Cl.
USPC .................................................. 718/1
(58) Field of Classification Search
None
See application file for complete search history.

(56) References Cited

U.S. PATENT DOCUMENTS

| | | | |
|---|---|---|---|
| 6,889,309 B1* | 5/2005 | Oliveira et al. | 711/203 |
| 7,028,305 B2 | 4/2006 | Schaefer | |
| 2002/0133529 A1* | 9/2002 | Schmidt | 709/102 |
| 2003/0065676 A1* | 4/2003 | Gbadegesin et al. | 707/104.1 |
| 2006/0085789 A1* | 4/2006 | Laborczfalvi et al. | 718/100 |
| 2006/0136653 A1 | 6/2006 | Traut | |
| 2006/0136934 A1* | 6/2006 | Nesher et al. | 719/324 |
| 2006/0184938 A1 | 8/2006 | Mangold | |
| 2006/0259731 A1 | 11/2006 | Oshins et al. | |
| 2008/0034005 A1* | 2/2008 | Satoyama et al. | 707/200 |
| 2009/0241108 A1* | 9/2009 | Edwards et al. | 718/1 |
| 2009/0319740 A1* | 12/2009 | Nishi | 711/163 |

FOREIGN PATENT DOCUMENTS

| | | |
|---|---|---|
| KR | 1020040053573 | 6/2004 |
| KR | 1020060028525 | 3/2006 |
| KR | 1020060062587 | 6/2006 |
| KR | 1020060071307 | 6/2006 |
| KR | 1020060117869 | 11/2006 |
| KR | 1020070100367 | 10/2007 |
| KR | 1020080051019 | 6/2008 |
| KR | 1020080079124 | 8/2008 |
| WO | WO 2008/069480 | 6/2008 |

* cited by examiner

*Primary Examiner* — Emerson Puente
*Assistant Examiner* — Dong Kim
(74) *Attorney, Agent, or Firm* — NSIP Law

(57) ABSTRACT

Provided are an apparatus and method for providing services using a virtual operating system (OS). The apparatus classifies virtual resources into a plurality of mutually exclusive regions and manages the virtual resources based on the provides services regions. The plurality of provides services regions include a virtual region whose resources are stored in and used on an external storage, and an overlay region whose resources refer to host resources. The apparatus uses the region information for virtual resources and a list of resources accessed for each application process to manage the virtual resources.

22 Claims, 7 Drawing Sheets

APPARATUS AND METHOD FOR PROVIDING SERVICES USING A VIRTUAL OPERATING SYSTEM

CROSS-REFERENCE TO RELATED APPLICATION

This application claims the benefit under 35 U.S.C. §119 (a) of Korean Patent Application No. 10-2008-0121863, filed on Dec. 3, 2008, the entire disclosure of which is incorporated by reference herein.

BACKGROUND

1. Field

The following description relates to a virtual operating system, and more particularly, to an apparatus and a method for providing services using a virtual operating system to support mobility.

2. Description of the Related Art

Recently, there has been research into technology that allows an application program or an operating system (OS) installed on one computer to be used with other computers. For example, such technology may include process migration, packaging by a server manager, and a virtual OS, among others.

Unlike a virtual system, a OS virtualization provides the same computing environment on a plurality of computers by installing a virtual OS layer between an OS and resident user application programs. A virtual OS stores and moves only the virtual OS layer, user application programs, and data.

SUMMARY

In one general aspect, an apparatus to provide services using a virtual operating system (OS) layer for one or more application processes and an OS of a device includes: a resource region storage configured to store region information for a plurality of virtual resources; an access resource list storage configured to store an access resource list of resources accessed by each application process; and a virtual resource manager to classify the virtual resources into a plurality of mutually exclusive regions and to manage the virtual resources using the region information for the virtual resources and the access resource list.

The plurality of regions managed by the virtual resource manager may include a virtual region configured to indicate the virtual resources stored in and used on an external storage configured to store information for the application services, and an overlay region configured to indicate the virtual resources that refer to host resources.

The plurality of regions managed by the virtual resource manager also may include a virtual region configured to indicate the virtual resources that are stored in and used on an external storage configured to store information for the application services, an overlay region configured to indicate the virtual resources that refer to host resources, and a system region configured to indicated virtual resources that are not allowed to be modified by any of the application processes.

The region information for the virtual resources stored by the resource region storage may include region information for virtual resources belonging to any region other than the virtual region.

The resource region storage may stores one or more of names of the virtual resources, paths through which the virtual resources are stored, and information about regions to which the virtual resources belong.

The virtual resource manager may be configured to classify virtual resources, among the virtual resources belonging to the overlay region, having a hierarchical structure, whose parent resources belong to a virtual region and whose child resources belong to an overlay region into a filter region, and manages the classified virtual resources having a hierarchical structure as virtual resources of the filter region.

The overlay region may be configured to indicate resources that are installed simultaneously with the initial installation of the device OS.

The virtual resource manager may be configured to copy a virtual resource belonging to the overlay region to the external storage device, to modify the copied resource when any attempt is made to modify the virtual resource belonging to the overlay region, delete region information for the virtual resource copied to the external storage from the resource region storage, and manage the copied resource as a resource of the virtual region.

The virtual resource manager may be configured to generate resource access information used to access the copied resource, store the resource access information in the access resource list storage, and manage the copied resource as a resource of the virtual region.

The access resource list storage may be configured to store names of resources, first resource access information used to access host resources, region information, and second resource access information used to access resources of the virtual region corresponding to host resources accessible by the first resource access information.

In another general aspect, a method of managing virtual resources in an apparatus using a virtual operating system (OS) layer to provide services for one or more application processes and an OS of a device includes: generating region information for the virtual resources; generating an access resource list of resources accessed for each application process; classifying the virtual resources into a plurality of mutually exclusive regions using the region information for the virtual resources and the access resource list; and managing the classified virtual resources based on the plurality of mutually exclusive regions.

Classifying the virtual resources into the plurality of mutually exclusive regions may include classifying virtual resources in a virtual region whose resources are stored in and used on an external storage device and in an overlay region whose resources refer to host resources.

Classifying the virtual resources into the plurality of mutually exclusive regions may include classifying virtual resources in a virtual region whose resources are stored in and used on an external storage device, an overlay region whose resources refer to host resources, and a system region whose resources are not allowed to be modified by any application process.

Generating the region information for the virtual resources includes generating region information for virtual resources belonging to all the mutually exclusive regions other than the virtual region.

Generating the region information may include storing one or more of names of resources, paths through which the resources are stored, and information about regions to which the resources belong.

Classifying the virtual resources may include classifying resources, among resources belonging to the overlay region, having a hierarchical structure, whose parent resources belong to a virtual region and whose child resources belong to an overlay region into a filter region, and managing the classified resources may include managing the classified virtual resources having a hierarchical structure as virtual resources of the filter region.

Managing the virtual resources may further include copying a virtual resource belonging to the overlay region to the external storage device when any attempt is made to modify the virtual resource belonging to the overlay region; modifying the copied virtual resource; and deleting the generated region information corresponding to the resource copied to the external storage from a resource region storage.

The method may further include generating resource access information used to access the copied resource; storing resource access information; and managing the copied resource as a resource classified in the virtual region.

Generating the access resource list may include generating names of resources, first resource access information used to access host resources, region information, and second resource access information used to access resources of the virtual region corresponding to host resources accessible by the first resource access information.

In yet another general aspect, a computer-readable recording medium having recorded thereon a program to manage virtual resources using a virtual operating system (OS) layer for one or more application processes, the program including instructions to cause a processor to: generate region information for the virtual resources; generate an access resource list of virtual resources accessed for each application process; classify the virtual resources into a plurality of mutually exclusive regions using the region information for the virtual resources and the access resource list: and manage the classified virtual resources using the plurality of mutually exclusive regions.

In yet another general aspect, a method of providing a virtual operating system OS layer running between one or more application programs and an OS of a host device may include: receiving a request to access a resource from a virtual process operating on the virtual OS layer; determining whether information about the requested resource is stored in a resource region storage; providing access to a host resource of the host device corresponding to the requested resource when the information is stored in the resource region storage; and adding information received from the OS to an accessed resource list of an access resource list storage corresponding to the requested resource.

The method may further include providing access to a virtual resource of an external storage device when the information is not stored in the resource region storage.

The method may further include: determining the virtual process operating on the virtual OS layer is attempting to modify a file associated with the host resource; performing a copy-on-modify operation to copy the modified file of the host resource to an external storage device; and deleting the information stored in the resource region storage. All further requests to access to the modified file associated with the requested resource may be considered as an access to a virtual resource of the external storage device.

Other features and aspects will be apparent from the following detailed description, the drawings, and the claims.

BRIEF DESCRIPTION OF THE DRAWINGS

Throughout the drawings and the detailed description, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Descriptions of well-known functions and structures may be omitted for increased clarity and conciseness.

Figure 1:
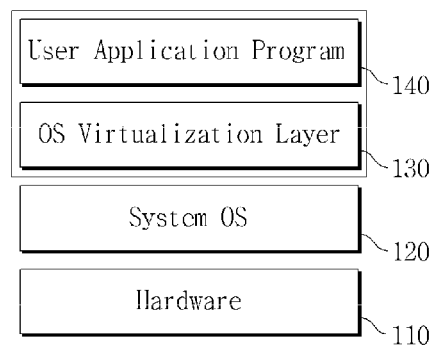
FIG. 1 shows an exemplary system structure for providing services using a virtual OS.

FIG. 1 shows an exemplary system structure to provide services using a virtual OS. The system structure includes a hardware layer 110, a system OS layer 120, an OS virtualization layer 130, and a user application program layer 140. Referring to FIG. 1, a computer system is able to use a computing environment of another computer by storing only data of the OS virtualization layer 130 and a user application program layer 140 using a virtual OS without storing any system OS. Accordingly, a mobile/moveable computing apparatus including the OS virtualization layer 130 and user application program layer 140 is provided.

Figure 2:
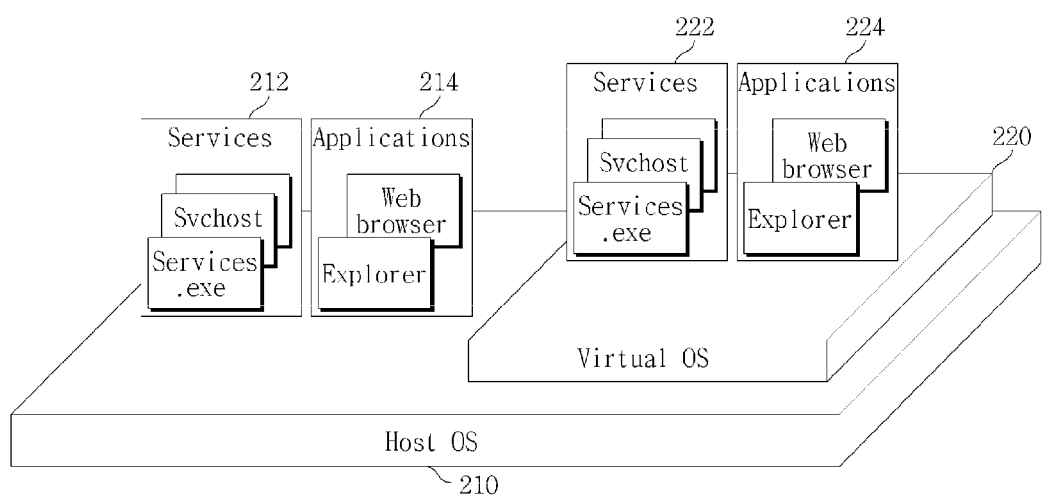
FIG. 2 illustrates exemplary operations in a virtual environment when Windows is used as an OS.

FIG. 2 illustrates exemplary operations in a virtual environment when Windows is used as an OS. Referring to FIG. 2, an exemplary OS virtualization apparatus 200 is configured with a Windows XP OS. When Microsoft Windows XP is used as the host OS 210, the apparatus 200 may run a number of services 212, 222 (e.g., a service control manager, such as service.exe or service host svhost.exe) and applications 214, 224 (e.g., web browsers, such as Explorer). The apparatus also may include a virtual OS 220. The virtual OS 220 provides virtual OS services between the host OS 210 and the services 222 and/or user applications 224 using a virtual environment.

Services 212 and user applications 214 of the host OS 210 to which no virtual OS service is provided receive system services provided directly by the host OS 210, regardless of the existence of any virtual OS 220. The services 222 and the user applications 224 operating on the virtual OS 220 receive virtual OS services from the virtual OS 220. Accordingly, the services 222 and/or the user applications 224 do not directly depend on the host OS 210. As a result, the services 222 and/or the user applications 224 receive the virtual OS services from the virtual OS 220 even after moving to another host and thereby facilitate a mobile computing by providing the same computing environment on multiple computers, as explained in further detail below.

In order to facilitate mobile computing, the virtual OS 220 divides system resources (e.g., in the case of the Microsoft Windows OS, files, registries, synchronization kernel objects, ports, Named Pipe, Mailslot, etc.) into multiple execution environments which are used by the services 222 and the user application programs 224.

Figure 3:
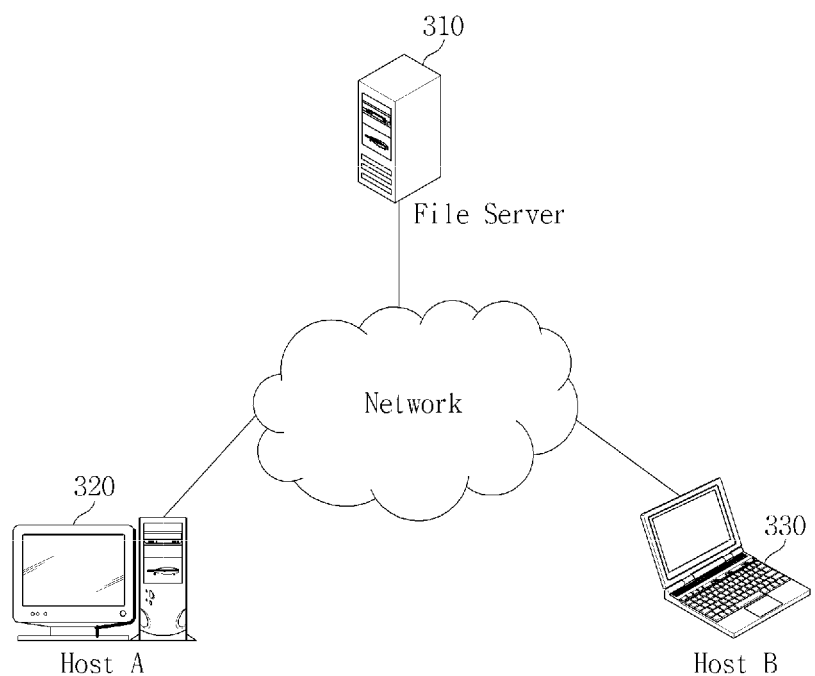
FIG. 3 illustrates an exemplary OS virtualization apparatus applied to a system that supports mobility of a computing environment between computers of a network.

FIG. 3 illustrates an exemplary OS virtualization system that supports mobility of a computing environment between computers in a network. Referring to FIG. 3, the OS virtualization apparatus is implemented as a mobile computing system 300 that includes a network 301, a file server 310, a host A 320, and host B 330. The mobile computing system 300 may provide virtual sources at a file server 310 located on the network 301 in a network-based environment. When a user of the OS virtualization apparatus migrates from the host A 320 to the host B 330, the OS virtualization apparatus provides the user with the same computing environment at host B 330 that is provided at host A 320.

Figure 4:
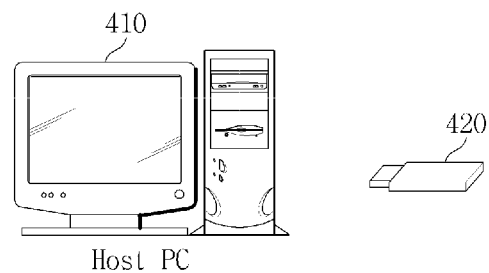
FIG. 4 illustrates an exemplary OS virtualization apparatus applied to a system that supports mobility of a computing environment using a removable storage device.

FIG. 4 illustrates an example of a OS virtualization apparatus that is applied to a system 400 including a host PC 410 that supports computing environment mobility using a removable storage 420.

When the OS virtualization apparatus is implemented using the removable storage 420 that stores an OS virtualization layer, user application programs, and user data, the OS virtualization apparatus provides a user with the same computing environment found at an arbitrary host PC (e.g., a host PC 410) at another computer when the user migrates to the other computer.

In order to ensure the execution of user application programs in a removable computing system using a virtual OS, a virtual layer functions to provide virtual OS resources. A technique of providing virtual OS resources includes virtualizing various system resources (e.g., files, system configuration, synchronization objects, network, memory) that a host OS provides to the user applications.

For example, in a Windows OS, a user application program that is installed in an external storage device (e.g., a network server or a removable hard disk, etc.) may be regarded as installed in a program file directory (e.g., C:\Program Files) of a drive of a host system (e.g., Drive C). When a request to read a data file from the directory in which the data file is installed is issued by the user application program, the virtual OS causes the corresponding data file to be read from the external storage device; however, the operation of virtual OS is transparent to the user application program.

For this process, the virtual OS uses name-space redirection. Name-space redirection copies all system resources of application programs to an external storage device to provide virtual resources corresponding to the system resources. However, name-space redirection, like Virtual Machine (VM) migration, requires a large amount of storage space (e.g., several GB to store the OS and applications of a computer, user data, etc). Accordingly, name-space redirection does not have an advantage of a virtual OS that provides services that are lightweight as compared to VM migration. For this reason, the virtual OS layer uses a resource overlay function to combine resources existing in a host system with resources existing in an external storage device to virtualize all resources as resources existing at one location.

Figure 5:
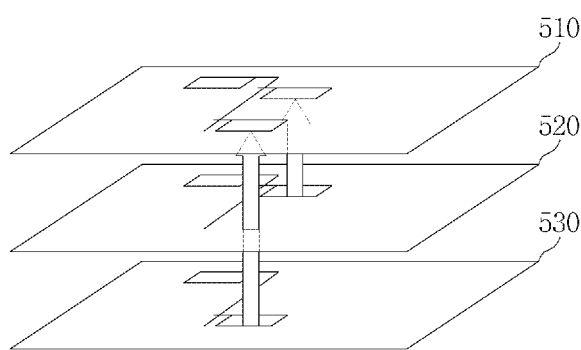
FIG. 5 illustrates an exemplary overlay function.

FIG. 5 illustrates an exemplary overlay function. A resource overlay function provides application programs with virtual resources corresponding to system resources. Referring to FIG. 5, host system resources 530 are stored at a host and system resources 520 are stored at an external storage device. Using the overlay function, the resources 520 and 530 are handled as if they are both system resources 510, existing at a single location of the host system. As a result of using the resource overlay function, the resources of a host system may be used anywhere by carrying a virtual OS layer, the user application programs, and the data (without carrying or storing all the resources in an external storage device).

Conventionally, a resource overlay function first searches for a desired resource in the resources of the external storage. If the desired resource is not found in the external storage the host system resources are searched for the desired resource. However, the conventional resource overlay function may cause serious performance deterioration since an external storage, which responds slowly to an application program resource request, is always searched first.

The virtual OS s a host protection function to prevent any modification of the resources of the host system. To implement the host protection function, a delete list is managed separately so that when a particular user application program deletes a virtual resource or modifies a virtual resource name, the deletion or the modification is not overlaid on resources located on the host system. However, host protection may severely complicate implementation of the overlay function.

In one example, an OS virtualization apparatus classifies virtual resources as belonging to one of several regions having various characteristics. The OS virtualization apparatus manages the virtual resources using the regions. As a result, an overlay calculation function is simplified to implement a light-weight virtual OS. In addition, the light-weight OS virtualization uses less external storage and improves resource access performance by reducing access of external storage. Hereinafter, an apparatus to provide services using light-weight OS virtualization is described in greater detail.

Figure 6:
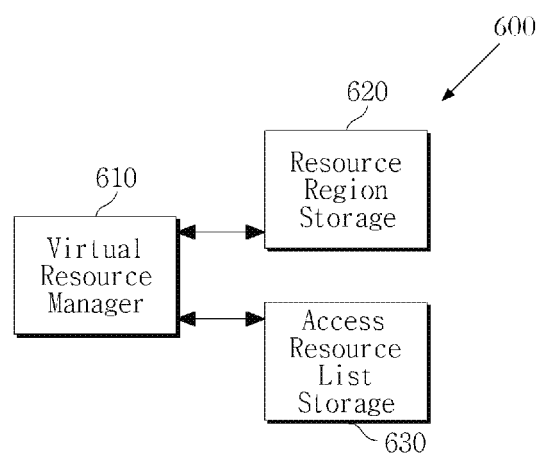
FIG. 6 is a block diagram of an exemplary apparatus for managing resource regions of a virtual OS.

FIG. 6 is a block diagram showing an exemplary apparatus 600 to manage resource regions and provide services using OS virtualization. The apparatus 600 includes a virtual resource manager 610, a resource region storage 620, and an access resource list storage 630.

The virtual resource manager 610 classifies virtual resources into a plurality of mutually exclusive regions and manages the virtual resources based on the mutually exclusive regions into which the virtual resources are classified. In this example, virtual resources may include all resources that applications operating on the virtual OS are capable of using (e.g., files, registries, synchronization objects, etc.). Accordingly, host resources also may be included as virtual resources when the host resources are used to provide services using the virtual OS. The virtual resource manager 610 manages the virtual resources using region information associated with the virtual resources that are stored in the resource region storage 620 in addition to an access resource list that is stored in the access resource list storage 630.

The plurality of mutually exclusive regions may include a virtual region and an overlay region. The virtual region includes resources for application services that are stored in and used in association with an external storage device containing region information for the application services. Resources classified in the virtual region do not exist in the host system. Therefore, these resources are distinguished from all resources that applications operating on the virtual OS can use. The overlay region includes resources that refer to host resources. The resources classified in the overlay region may be modified by a particular operation, such as a write operation of an application, among the resources that exist in the host system.

In another example, the plurality of mutually exclusive regions may include a virtual region, an overlay region, a filter region, and a system region. The overlay region, as pointed out above, classifies resources that are stored in and used in association with an external storage device that stores region information associated with the application services. The overlay region classifies resources that refer to host resources. The system region includes resources that cannot be modified by any application services. The virtual resource manager 610 classifies resources, among resources belonging to the overlay region, having a hierarchical structure, for example, resources whose parent resources belong to the virtual region and whose child resources belong to the overlay region, into a filter region, and manages the resources as resources of the filter region.

The resource region storage 620 stores region information about the virtual resources. The region information may include region information for virtual resources belonging to all regions other than the virtual region. The resource region storage 620 does not store information for resources belonging to the virtual region because information about these resources may be stored in and managed by the external storage.

The region information for the virtual resources may include resource names, resource paths, and information about regions to which the resources belong to. The resource region storage 620 stores a list of resources, other than resources belonging to the virtual region, as a file in the external storage device. The file is loaded into a memory of a host device when the corresponding virtual OS layer is started. The file may be configured in various structures, such as, for example, a hash table or a tree structure in order to facilitate searching.

The access resource list storage 630 stores in a memory of the host device an access resource list of resources that are accessible by each application process. The access resource list storage 630 may store resource names, host resource access information used to access host resources, region information, and virtual resource access information used to access a virtual region corresponding to host resources accessible through the host resource access information. When the OS of a host system is Windows, the host and virtual resource access information may be "handles" (i.e., a unique identifier for all objects that the kernel is responsible for). The host resource access information and the virtual resource access information are managed in pairs. As a result, the host and virtual resource access information are referred to as "pair handles." The resource access information may have various formats according to the type of host system.

When a user application program operating on the virtual OS layer performs an operation that does not modify the content of a file, such as the reading of resources, the user application program continues to provide services using the host resources even when the external storage device does not store the corresponding file. Thereafter, when the user application program migrates to a new host and tries to use the file that was used in the previous host, the user application program is able to continue to use the file on the new host when the previous host and a new host have the same OS, since the file associated with the overlay region also is provided at the new host.

Meanwhile, if a user application program operating on the virtual OS layer performs an operation that modifies the content of a file resource, such as writing or deleting of resources, the virtual OS layer detects the operation and may perform a "copy-on-modify" operation to copy a host resource corresponding to the modified file resource to the external storage. That is, when the virtual resource manager 610 attempts to modify a resource belonging to the overlay region, the virtual resource manager 610 copies the resource to an external storage device, modifies the resource, and then deletes region information associated with the resource from the resource region storage 620. In addition, the virtual resource manager 610 may generate resource access information for use in accessing the resource copied to the external storage device, store the resource access information in the access resource list storage 630, and manage the resource copied to the external storage device as a resource belonging to the virtual region.

By applying the copy-on-modify scheme to the overlay region managed by the resource region storage 620, the resources of the host system are protected from user application programs operating on the virtual OS layer. In addition, reflecting all modifications to the external storage ensures the same system resources are available to user application programs operating on the virtual OS layer after the user application programs migrate to another computing environment.

The resource region management apparatus 600 may be applied to a virtual environment system to provide mobile computing by storing a personal computing environment in an external storage, such as at a network or in a removable storage, and using the personal computing environment in all computers without storing the personal computing environment in the computers.

If a virtual OS layer is applied to consumer electronic devices, product differentiation may be provided since management software can be used conveniently. For example, music management/purchasing software for MP3 devices may be used consistently in any personal computer (PC) by using the same user settings at each PC without having to install the management/purchasing software on each PC. Similarly, motion picture editing software for digital cameras/camcorders may be used in any PC without installing the software on the PC, so that products capable of conveniently editing user created contents (UCC) can be implemented.

In addition, the virtual OS layer may reduce the complexity of system management of software maintenance/renewal and settings of PCs distributed in a company thereby providing a reduction in costs associated with system management. For example, conventionally, reinstallation of an OS and application software is needed whenever PCs are upgraded or repaired. However, if the virtual OS layer as described herein is applied, only reinstallation of the OS is needed. As a result, a significant reduction of management costs may be achieved from the time saved that was previously associated with having to reinstall the application software.

Figure 7:
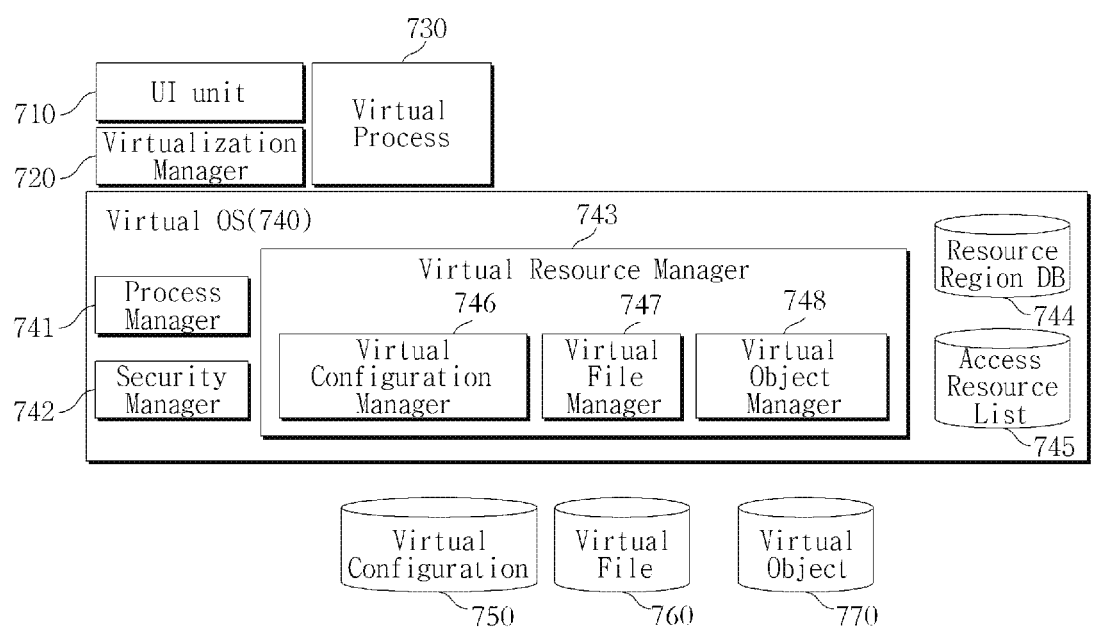
FIG. 7 is a view showing an exemplary system configuration of an apparatus for managing resource regions in a virtual OS.

FIG. 7 illustrates a system configuration of an exemplary apparatus for managing resource regions in a virtual OS. Referring to FIG. 7, a virtualization layer includes a user interface unit 710, a virtual manager 720, a virtual processor 730, and a virtual OS unit 740. The user interface unit 710 provides users with a user interface in a personalized computing environment. For example, when the OS of a host system is Windows™, the user interface unit 710 creates a new desktop and a new shell for the user. The shell is executed on the virtual OS. The virtual manager 720 is in charge of starting OS virtualization and finishing OS virtualization procedures, among others, of the OS virtualization. For example, the starting OS virtualization procedure loads the lightweight virtual OS layer to the host system kernel memory and creates a new desktop and executing new shell on the virtual OS. The finishing OS virtualization procedure provides the opposite function. The virtual process 730 is a virtual process that is using the virtual OS. The process manager 741 manages the list of the virtual processes 730. For example, the process manager 741 monitors creation and termination of processes. The process manager 741 also manages a process tree or target process list, composed of the virtual processes 730 so that the processes may be executed on the virtual OS. The process tree is stored in the host system memory and is managed by process manager 741. For example, assume that a process A is a virtual process. When process A creates a child process B, the processor manager 741 recognizes the creation of the child process B and determines whether the process A is a virtual process. After the virtual process manager 741 determines that the process A is a virtual process on the target process list, the virtual process manager 741 inserts the child process B into the process tree so that the child process B may be executed on the virtual OS layer.

The virtual OS unit 740 provides the virtual OS layer. The virtual OS unit 740 includes a process manager 741, a security manager 742, a virtual resource manager 743, a resource region storage database 744, and an access resource list storage 745.

The process manager 741 manages the processes as described in the previous paragraph. The security manager 742 performs a security function on virtual resources.

The virtual resource manager 743 manages virtual resources using virtual resource management and is an example of the resource manager 610 illustrated in FIG. 6. The virtual resource manager 743 may include a virtual configuration manager 746, a virtual file manager 747, and a virtual object manager 748. The virtual configuration manager 446 manages system settings. In the MS Windows system, an example of a system setting is Windows Registry where the virtual resource manager manages a virtual registry for the virtual OS layer. The virtual object manager 748 manages resources, such as various synchronization objects, among others. The virtual object manager 748 manages various synchronization objects and inter process communication objects, such as, for example, semaphore, mutex, timer, and named pipe to mention a few.

A resource region database 744 stores region information of resources and corresponds to the resource region storage 620 illustrated in FIG. 6. An access resource list 745 stores the states of resources used by virtual processes operating on the virtual OS and corresponds to the access resource list storage unit 630 illustrated in FIG. 6.

In addition, virtual resources, such as virtual configuration 750, virtual files 760, and virtual objects 770, among others, may be located in an external storage or execution memory (not shown). The virtual resources 750, 760, 770 may be the data for virtual managers 746, 747, and 748. For example, in the MS Windows™ system, virtual configuration 750 may be a virtual registry hive data and the virtual configuration manager 746 uses this data.

Figure 8:
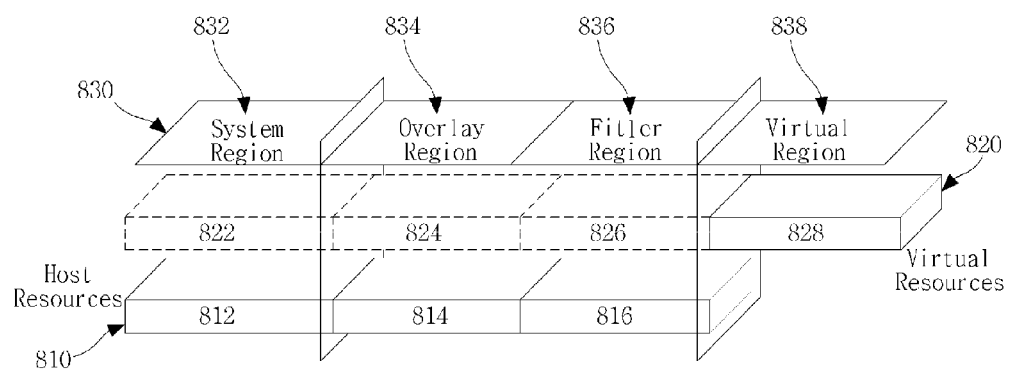
FIG. 8 shows an exemplary configuration of divided resource regions for a virtual OS.

FIG. 8 shows an exemplary division of resource regions. FIG. 8 shows host resources 810 stored in and used by a host system. The host resources 810 include, for example, resources 812, 814, and 816. The virtual resources 820 include all resources used by applications in a virtual OS environment, such as, for example, resources 828. The resource regions 830 are divided into a system region 832, an overlay region 834, a filter region, 836, and a virtual region 838. The respective resource regions 830 are mutually exclusive. According to one example, the virtual resources 820 are classified into the system region 832, the overlay region 834, the filter region 836, and the virtual region 838.

The resources of the system region 832, which include host resources 810 of a host system, are resources that cannot be modified by user application programs while the OS is running, or resources that are accessible only by the host system due to functional necessity. Accordingly, the resources of the system region 832 are excluded from the virtual resources that are to be managed.

The resources 814 of the overlay region 834 are resources that are subjected to the overlay function. The resources subjected to the overlay region 834 are resources that exist in the host system, but are capable of being modified by an operation, such as writing, of an application. The resources of the overlay region 834 are resources that the OS always requires access to, that is, these resources are common to all host computers that use the same OS. All modifications performed on resources classified in the overlay region 834 are reflected in the virtual region 838 in order to maintain the consistency of these resource modifications across all host systems, for example, when applications and the virtual OS migrate from one host computer to another. For this region 834, the copy-on-modify scheme described above is performed for modifications to resources classified in this region.

The filter region 836 may be included as part of the overlay region 834, or the filter region 836 may be selectively managed separately from the overlay region 834. The filter region 836 includes resources that have a hierarchical structure among the resources of the overlay region 834. The resources of the filter region 836 include resources whose parent resources belong to the virtual region 838 and whose child resources belong to the overlay region 834. In the filter region 836, the parent resources of the resources having a hierarchical structure include the virtual resources 826, and the child resources of the resources having a hierarchical structure in the filter region 836 include resources used by overlaying the virtual resources 826 and the host resources 816. For example, in the case of a registry that stores system settings of the Microsoft Windows OS, the registry may be composed of keys having a hierarchical structure and values belonging to the respective keys. If a specific key belongs to the filter region 836, existence of the specific key is determined by the virtual resource 824. If the corresponding key exists in the virtual resources 826, the content of values belonging to the corresponding key is determined by referring to both the virtual resources 826 and host resources 816.

The resources of the virtual region 838 may be resources located in an external storage. All reading and write operations associated with the virtual region 838 are performed on the external storage.

For example, in the case of the OS Microsoft Windows XP, when all files are file resources, the file resources are classified into the system region 832, the overlay region 834, the filter region 836, and the virtual region 838. The file resources are processed differently according to their classification in each region in the OS virtualization layer. Lists of resources belonging to each of the respective regions 832, 834, and 836 are stored in the resource region storage 620 or resource region database 744. The lists may be determined as follows.

A list of the system region 832 may include a list of kernel files of Microsoft Windows XP, such as ntoskrnl.exe. A list of the overlay region 834 may include a list of all system files that are installed when the OS Microsoft Windows XP is initially installed. A list of the virtual region 838 may include a list of application files that are installed on the virtual OS layer in an external storage by a user.

In the case of the virtual region 838, there is no need to configure and store a list separately in the resource region storage 620. Since the number of resources of virtual region 838 tends to increase over time as users install and use user application programs on the virtual OS layer, the size of a list associated with the virtual region 838 also increases. However, since the resources remaining after excluding the resources of the system region 832, the overlay region 834, and the filter region 836 in the virtual resource region 830 are the resources of the virtual region 838, the resources of the virtual region 838 can be distinguished without having to create a separate list of those resources.

When file resources are divided into virtual regions in this way, file virtualization may be performed for each region. That is, if a file that a virtualized user application program operating on the virtual OS layer tries to access belongs to the system region 832, the host resources 810 are directly used. If the file belongs to the virtual region 838, the virtual resources 828 stored in the external storage are used. When the file belongs to the overlay region 834, by redefining all virtual resources 824 belonging to the overlay region 834 as belonging to the virtual region 838, processing may be simplified.

A high resource access speed is attained by differentiating resource access methods according to the region to which a resource belongs based on the resource region information loaded in the memory of the host system. That is, for example, in the case of accessing resources belonging to the system region 832, direct access to the corresponding host resources is allowed, and in the case of accessing resources belonging to the virtual region 838, direct access to the corresponding virtual resources maintained by the external storage is allowed. In addition, in the case of accessing resources belonging to the overlay region 834, access to a desired resource is allowed only by searching for the resource in the resource region storage 620 (or resource region database 744), without having to access the external storage, which may have an access speed that is lower than the memory of the host (e.g., a hard disk of the host). As a result, an overall very high resource access speed is attained.

Generally, in the case of an OS, such as Microsoft Windows, various application programs, such as Internet Explorer or some other web browser, Windows Media Player, and the like, which are installed together with the Microsoft Windows OS, belong to the overlay region 834 since the application programs typically are not installed directly by users. Accordingly, access to such application programs, as well as to the OS, is speeded up considerably.

By configuring the resource region storage 620 or resource region database 744 as lists of resources belonging to all the regions other than the virtual region 838, overall memory consumption is saved. That is, information of the resource region storage 620 or 744, which is loaded in the memory of the host system when a user starts the virtual OS layer, is configured as lists of all the virtual regions (e.g., the system region 832, the overlay region 834, and the filter region 836) other than the virtual region 838. Therefore, it is possible to determine which region a resource belongs to without having to separately manage a list of resources belonging to the virtual region 838 (which continues to increase in size as user application programs are installed or used through the virtual OS layer). In addition, by copying a modified resource to the virtual region 838 and deleting the corresponding information for the resource from the resource region storage 620 or the resource region database 744, lists of the resource region storage 620 or the resource region database 744 decrease the more the virtual OS layer is used. As a result, the memory of the host system is saved and search speed is increased.

Figure 9:
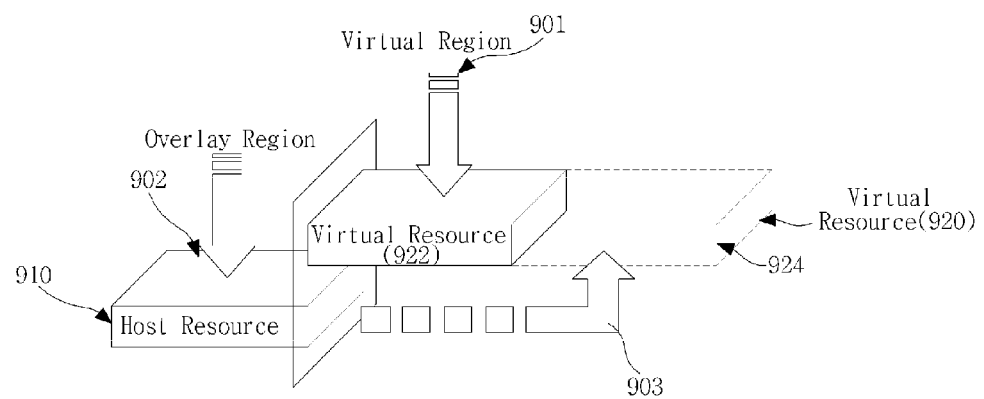
FIG. 9 illustrates an exemplary process for accessing an overlay region and a virtual region of a virtual OS.

FIG. 9 illustrates an exemplary process for accessing an overlay region and a virtual region. FIG. 9 shows an exemplary configuration 900 of resource regions that are configured as two regions: a virtual region 901 and an overlay region 902. The configuration 900 is possible since the system region (e.g., region 832 of FIG. 8) can be removed by including all undesignated objects that do not cause any modification of the host resources in the overlay region 834. The overlay region 902 may classify resources of the host system (e.g., host resource 910), and the virtual region 901 may classify virtual resources 920 (e.g., virtual resource 922).

Referring to FIG. 9, when a user application program operating on the virtual OS layer accesses a file belonging to the overlay region 902, a virtual OS layer provides access to the host resource 910 (e.g., corresponding to the accessed file) to the user application program.

If the user application program operating on the virtual OS layer tries to modify the file associated with the host resource 910, such as using a write or delete operation, the OS virtualization layer detects the attempt and performs a copy-on-modify operation 903 to copy the modified file of the host resource 910 to an external storage. That is, the modified file of the host resource 910 is copied to the external storage as a newly located virtual resource 924 and the host resource 910 is deleted from the overlay region of the resource region storage 620 or the resource region database 744. Thereafter, the modified file is processed as a resource belonging to the virtual region 901. That is, access to the modified file associated with the resource is considered as an access to the virtual region 901, so that all other modifications of the resource are reflected in virtual resources of the virtual region 901.

The pair-mapping relationship between resource access information for host resources corresponding to resources copied from the overlay region to the virtual region and resource access information for virtual resources corresponding to the copied resources can be stored in the access resource list storage 630 or the access resource list storage 745. The access resource list storage may be used to manage the pair-mapping relationship for each process.

In the case of an OS, such as Windows, all resource handles are managed by the OS for each process. That is, each handle has a unique value associated with each process that is allocated by the OS. If two files, for example, "A.txt" and "B.txt" are both used by process A and process B, then process A may receive a first handle for A.txt and a second handle for B.txt, and process B can receive a third handle for B.txt. Accordingly, resource access information used by processes is managed for each process.

In the case where a host system uses a Windows OS, resource access information for host resources are file handles, and resource access information for virtual resources are virtual resource file handles. Accordingly, when user application programs operating on the virtual OS layer try to access a file with the same resource file handle, a file service may be provided to the user application programs by using a method in which a virtual OS layer replaces the handle with a pair handle to have access to the file internally.

Resource region information stored in the resource region storage 620 or the resource region database 744 is wholly managed by the virtual OS layer and is used to search for a desired resource in response to a resource request from an application program operating on the virtual OS layer. An access resource list of the access resource list storage 630 or the access resource list 745 may be configured in a memory for each process. That is, the access resource list may be used by loading access resource information for each process in the memory of a host system.

In one implementation, an access resource list used by a process may be stored and used in the form of a hash or a list in a heap memory of the process. Process IDs and access resource information are stored wholly in the OS virtual layer so that the process IDs and access resource information can be searched for and used according to each process ID. Accordingly, only resources accessed by each process are managed so that the resources used by each process can be searched for at high speed.

Meanwhile, the lists of the overlay region may be configured as a union of OS minor version resources to handle differences between the resources provided by each OS minor version. For example, in the case of Microsoft Windows XP, if the OS is updated with one or more of the respective service packs 0, 1, 2, 3, etc., each updated OS may have different system files. Here, although overlay region lists are configured as a union of all system files installed simultaneously when Microsoft Windows XP service packs 0, 1, 2, 3 . . . are initially installed, the overlay region lists may be configured with a small memory capacity. Since the lists are stored in the overlay region, access to system files existing on a host system based on any one of the Microsoft Windows XP service packs 0, 1, 2, 3 is possible if a virtual OS layer is running on the corresponding host system. Also, the overlay resource lists configured above are configured only once for each OS.

Figure 10:
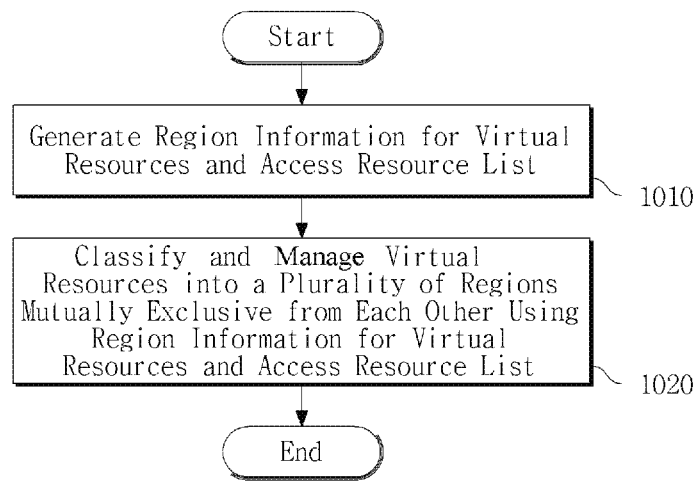
FIG. 10 is a flowchart of an exemplary resource management method for a virtual OS.

FIG. 10 is a flowchart of an exemplary virtual resource management method for providing services using a virtual OS layer.

Region information for virtual resources and an access resource list of resources accessed for each application process are generated (1010).

The virtual resources are classified into a plurality of mutually exclusive regions using the region information of the virtual resources and the access resource list, and the virtual resources are managed based on the regions into which they are classified (1020).

The plurality of mutually exclusive regions may include a virtual region and an overlay region. The virtual region includes resources that are stored in and used on an external storage and includes information associated with the application services. The overlay region includes resources that refer to host resources and allows space of the external storage to be saved. In another example, the plurality of mutually exclusive regions may include the virtual region, the overlay region, and an additional system region. The system region includes resources that cannot be changed by application services. The region information associated with the resources is region information of virtual resources belonging to the all the regions other than the virtual region.

To implement a light-weight virtual OS, an overlay calculation function is simplified by dividing the virtual resources into a plurality of mutually exclusive regions and managing the virtual resources based on where the resources are classified in the mutually exclusive regions. As a result, an external storage is used less and resource access performance is improved.

Hereinafter, an exemplary method of driving a system in a virtual environment is described in detail with reference to FIGS. 11 and 12, wherein it is assumed that a host system uses Windows as an OS.

Figure 11:
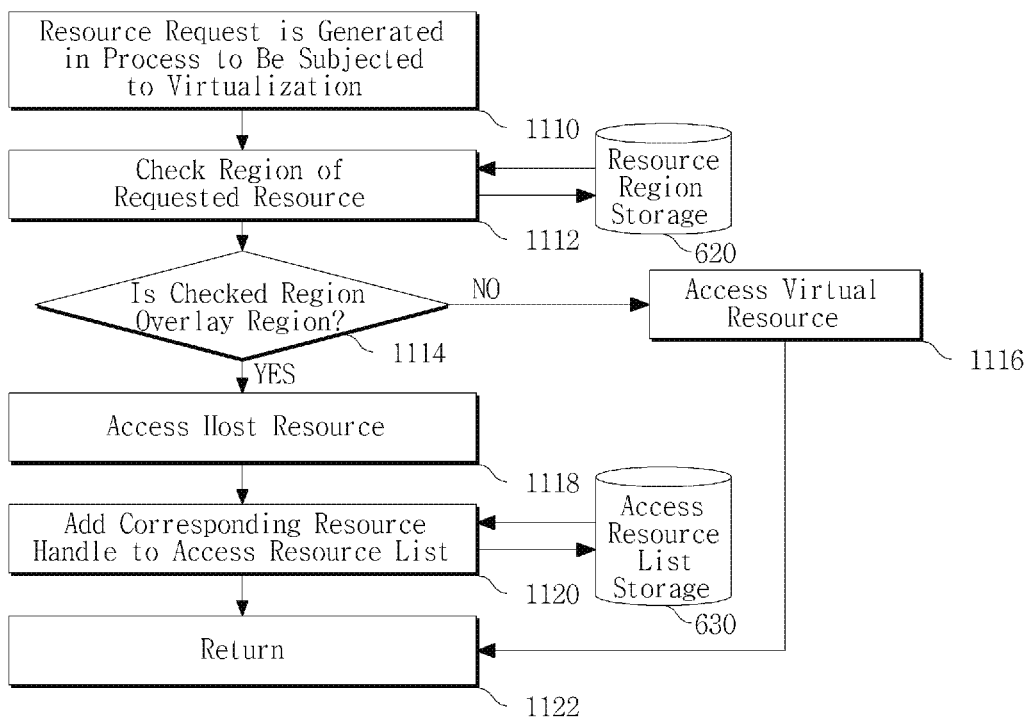
FIG. 11 is a flowchart of an exemplary method for driving a virtual environment system.

FIG. 11 is a flowchart of an exemplary method for driving a virtual environment system. As shown in FIG. 11, when a request to access a resource is issued from a process operating on the virtual OS layer (1110), the region the requested resource belongs to is determined through access of the resource region storage 620 or the resource region database 744 (1112).

The region the requested resource belongs to can be determined at a very high speed when the resource region storage 620 or the resource region database 744 includes lists of files that only belong to the overlay region (or any region other than the virtual region).

If the requested resource belongs to the overlay region (1114), access to a host resource corresponding to the requested resource is provided (1118). The process adds a handle received from the OS to an accessed resource list of the access resource list storage 630 or the access resource list 745 (1120) to provide virtualization of various file operations that are performed using the same handle.

If the requested resource does not belong to the overlay region, the resource is considered to belong to the virtual region and access to a virtual resource corresponding to the requested resource is provided (1116).

Figure 12:
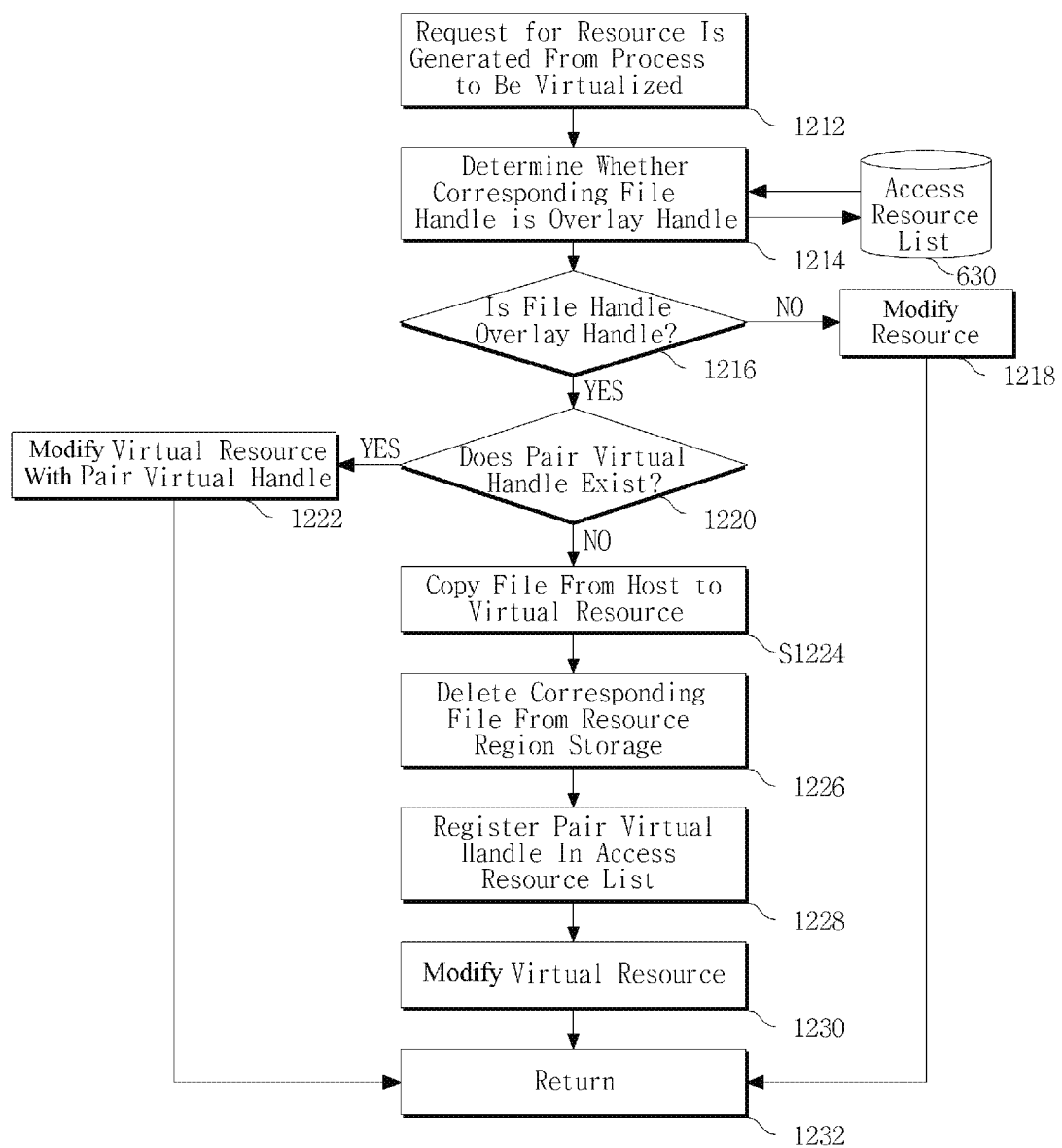
FIG. 12 is a flowchart of an exemplary operation for modifying a file with a file access handle in a process that is virtualized.

FIG. 12 is a flowchart of an exemplary operation to modify a file with a file access handle in a virtual process.

When a request to modify a resource is issued by a process operating on the virtual layer (1212), first it is determined whether a file handle corresponding to the resource is an overlay handle registered in the access resource list storage 630 or the access resource list 745 that manages resources for each process (1214 and 1216). If the corresponding file handle is not an overlay file handle, the request is considered as a request to modify a virtual resource of the virtual region, and the corresponding virtual resource is modified (1218). If the file handle is an overlay file handle, it is determined whether a pair of virtual handles received from the access resource list exists (1220).

If a pair of virtual handles exists, a virtual resource of the virtual region corresponding to the requested resource is modified with the pair of virtual handles (1222). If no pair of virtual handles exists, the request is considered to be an initial request to modify the corresponding resource. As a result, the requested resource is copied from a host resource to a virtual resource so that the host resources are protected and all modifications to the requested resource are reflected in virtual resources (1224).

Since a file has been newly created in the virtual resources of the virtual region, the file now belongs to the virtual region, and the file is removed from the resource region storage 620 or the resource region database 744 (1226). A pair of virtual handles is registered in the access resource list of the access resource list storage 630 or the access resource list 745 (1228). Then, if a modification is performed on the virtual resource of the virtual region (1230), all processing is complete.

One skilled in the art will appreciate that the various units, apparatus, managers, layers, storage, processes, and methods described above may be implemented using various hardware. For example, the units, the apparatus, the managers, the layers describe above may be implemented using a processing device. The processing device may be any general-purpose or special purpose computer, such as, for example, a processor, a digital signal processor, a microcomputer, a field programmable array, a programmable logic unit, a microprocessor or any other device capable of performing calculations and/or responding to and executing instructions in a defined manner according to the method, processes, and configurations described herein. The processing device may run one or more software applications that implement the various layers, methods, processes, and functions described above. The processing device also may access, store, manipulate, process, and create data and information in response to these applications. The software applications may include a computer program, a piece of code, an instruction, or some combination thereof, for independently or collectively instructing the processing device to operate as desired. In addition, hardwired logic or a combination of hardwired logic and software also may be used to implement the functions, layers, processes, mangers, units, and apparatus described herein.

The processes, functions, methods and software described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media and storage devices include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, static dynamic memories, a DROM, a flip-flop, a register, a buffer, an SRAM, DRAM, PROM, EPROM, OPTROM, EEPROM, NOVRAM, or RAMBUS), such that if the media is read or accessed by the processing device, the specified steps, processes, and/or instructions are performed and/or data is accessed, processed, or stored. The memory may include an I/O interface, such that data and applications may be loaded and stored in the memory allowing the applications, programming, and data to be updated, deleted, changed, or augmented. Examples of program instructions include machine code, such as produced by a compiler, and files containing higher level code that may be executed by the computer using an interpreter. The described hardware devices may be configured to act as one or more software modules or units in order to perform the operations and methods described above, or vice versa.

It will be apparent to those skilled in the art that various modifications can be made in the present invention without departing from the spirit or scope of the invention. Thus, it is intended that the present invention covers the modifications of this invention provided they come within the scope of the appended claims and their equivalents.

What is claimed is:

1. An apparatus to provide services using a virtual operating system (OS) layer for one or more application processes and an OS of a device, the apparatus comprising:
   a resource region storage configured to store region information for a plurality of virtual resources;
   an access resource list storage configured to store an access resource list of resources accessed by each application process; and
   a virtual resource manager configured to classify the virtual resources into a plurality of mutually exclusive regions and to manage the virtual resources using the region information for the virtual resources and the access resource list,
   wherein the virtual resource manager is configured to classify virtual resources, among the virtual resources belonging to an overlay region, comprising a hierarchical structure, whose parent resources belong to a virtual region and whose child resources belong to the overlay region, into a filter region, and to manage the classified virtual resources comprising the hierarchical structure as virtual resources of the filter region.

2. The apparatus of claim 1, wherein the plurality of mutually exclusive regions managed by the virtual resource manager comprise the virtual region configured to indicate the virtual resources stored in and used on an external storage device configured to store information for application services, and the overlay region configured to indicate the virtual resources that refer to host resources.

3. The apparatus of claim 1, wherein the plurality of mutually exclusive regions managed by the virtual resource manager comprise the virtual region configured to indicate the virtual resources that are stored in and used on an external storage configured to store information for application services, the overlay region configured to indicate the virtual resources that refer to host resources, and a system region configured to indicate virtual resources that are not allowed to be modified by any of the application processes.

4. The apparatus of claim 1, wherein the region information for the virtual resources stored by the resource region storage comprises region information for virtual resources belonging to any region other than the virtual region.

5. The apparatus of claim 4, wherein the resource region storage is configured to store one or more of names of the virtual resources, paths through which the virtual resources are stored, and information about regions to which the virtual resources belong.

6. The apparatus of claim 1, wherein the access resource list storage is configured to store names of resources, first resource access information used to access host resources, region information, and second resource access information used to access resources of the virtual region corresponding to the host resources accessible by the first resource access information.

7. An apparatus to provide services using a virtual operating system (OS) layer for one or more application processes and an OS of a device, the apparatus comprising:
   a resource region storage configured to store region information for a plurality of virtual resources;
   an access resource list storage configured to store an access resource list of resources accessed by each application process; and
   a virtual resource manager configured to classify the virtual resources into a plurality of mutually exclusive regions and to manage the virtual resources using the region information for the virtual resources and the access resource list,
   wherein the plurality of mutually exclusive regions managed by the virtual resource manager comprise a virtual region configured to indicate the virtual resources stored in and used on an external storage device configured to store information for application services, and an overlay region configured to indicate the virtual resources that refer to host resources. and
   wherein the overlay region is configured to indicate system files that are installed simultaneously with an initial installation of the OS.

8. An apparatus to provide services using a virtual operating system (OS) layer for one or more application processes and an OS of a device, the apparatus comprising:
   a resource region storage configured to store region information for a plurality of virtual resources:
   an access resource list storage configured to store an access resource list of resources accessed by each application process; and
   a virtual resource manager configured to classify the virtual resources into a plurality of mutually exclusive regions and to manage the virtual resources using the region information for the virtual resources and the access resource list,
   wherein the plurality of mutually exclusive regions managed by the virtual resource manager comprise a virtual region configured to indicate the virtual resources stored in and used on an external storage device configured to store information for application services, and an overlay region configured to indicate the virtual resources that refer to host resources, and wherein the virtual resource manager is configured to copy a virtual resource belonging to the overlay region to the external storage device, to modify the copied virtual resource when any attempt is made to modify the virtual resource belonging to the overlay region, to delete region information for the virtual resource copied to the external storage device from the resource region storage, and to manage the copied virtual resource as a resource of the virtual region.

9. The apparatus of claim 8, wherein the virtual resource manager is configured to generate resource access information used to access the copied virtual resource, and to store the resource access information in the access resource list storage.

10. A method of managing virtual resources in an apparatus using a virtual operating system (OS) layer to provide services for one or more application processes and an OS of a device, the method comprising:

generating region information for the virtual resources;
generating an access resource list of resources accessed for each application process;
classifying the virtual resources into a plurality of mutually exclusive regions using the region information for the virtual resources and the access resource list; and
managing the classified virtual resources based on the plurality of mutually exclusive regions,
wherein the classifying of the virtual resources comprises classifying virtual resources, among virtual resources belonging to an overlay region, comprising a hierarchical structure, whose parent resources belong to a virtual region and whose child resources belong to the overlay region, into a filter region, and the managing of the classified virtual resources comprises managing the classified virtual resources comprising the hierarchical structure as virtual resources of the filter region.

11. The method of claim 10, wherein the classifying of the virtual resources into the plurality of mutually exclusive regions comprises classifying virtual resources in the virtual region whose virtual resources are stored in and used on an external storage device, and in the overlay region whose virtual resources refer to host resources.

12. The method of claim 10, wherein the classifying of the virtual resources into the plurality of mutually exclusive regions comprises classifying virtual resources in the virtual region whose virtual resources are stored in and used on an external storage device, in the overlay region whose virtual resources refer to host resources, and in a system region whose virtual resources are not allowed to be modified by any application process.

13. The method of claim 10, wherein the generating of the region information for the virtual resources comprises generating region information for virtual resources belonging to all of the mutually exclusive regions other than the virtual region.

14. The method of claim 13, wherein the generating of the region information comprises storing one or more of names of resources, paths through which the resources are stored, and information about regions to which the resources belong.

15. The method of claim 10, wherein the generating of the access resource list comprises generating names of resources, first resource access information used to access host resources, region information, and second resource access information used to access resources of the virtual region corresponding to the host resources accessible by the first resource access information.

16. A method of managing virtual resources in an apparatus using a virtual operating system (OS) layer to provide services for one or more application processes and an OS of a device, the method comprising:

generating region information for the virtual resources;
generating an access resource list of resources accessed for each application process;
classifying the virtual resources into a plurality of mutually exclusive regions using the region information for the virtual resources and the access resource list; and
managing the classified virtual resources based on the plurality of mutually exclusive regions,
wherein the classifying of the virtual resources into the plurality of mutually exclusive regions comprises classifying virtual resources in a virtual region whose virtual resources are stored in and used on an external storage device, and in an overlay region whose virtual resources refer to host resources, and
wherein the managing of the classified virtual resources comprises
copying a virtual resource belonging to the overlay region to the external storage device when any attempt is made to modify the virtual resource belonging to the overlay region,
modifying the copied virtual resource, and
deleting the generated region information corresponding to the virtual resource copied to the external storage from a resource region storage.

17. The method of claim 16, further comprising:
generating resource access information used to access the copied virtual resource;
storing the resource access information; and
managing the copied virtual resource as a resource classified in the virtual region.

18. A non-transitory computer-readable recording medium having recorded thereon a program to manage virtual resources using a virtual operating system (OS) layer for one or more application processes, the program comprising instructions to cause a processor to:

generate region information for the virtual resources;
generate an access resource list of virtual resources accessed for each application process;
classify the virtual resources into a plurality of mutually exclusive regions using the region information for the virtual resources and the access resource list; and
manage the classified virtual resources using the plurality of mutually exclusive regions, wherein the classifying of the virtual resources comprises classifying virtual resources. among virtual resources belonging to an overlay region, comprising a hierarchical structure, whose parent resources belong to a virtual region and whose child resources belong to the overlay region, into a filter region, and the managing of the classified virtual resources comprises managing the classified virtual resources comprising the hierarchical structure as virtual resources of the filter region.

19. A method of providing a virtual operating system OS layer running between one or more application programs and an OS of a host device, the method comprising:

receiving a request to access a resource from a virtual process operating on the virtual OS layer;
determining a region of the requested resource that is stored in a resource region storage;

determining whether the region of the requested resource is an overlay region among mutually exclusive regions;

providing access to a host resource of the host device corresponding to the requested resource when the region of the requested resource is the overlay region; and adding information received from the OS to an accessed resource list of an access resource list storage corresponding to the requested resource, wherein the mutually exclusive regions comprise a virtual region configured to indicate virtual resources stored in and used on an external storage device configured to store information for application services, and an overlay region configured to indicate virtual resources that refer to host resources, and to indicate system files that are installed simultaneously with an initial installation of the OS.

20. The method of claim 19 further comprising providing access to a virtual resource of an-the external storage device when the region of the requested resource is not the overlay region.

21. The method of claim 19 further comprising:

determining the virtual process operating on the virtual OS layer is attempting to modify a file associated with the host resource;

performing a copy-on-modify operation to copy the modified file of the host resource to the external storage device; and deleting information stored in the resource region storage.

22. The method of claim 21, wherein all further requests to access the modified file associated with the requested resource are considered as an access to a virtual resource of the external storage device.

* * * * *